(12) United States Patent
Daqqa et al.

(10) Patent No.: US 9,484,686 B2
(45) Date of Patent: Nov. 1, 2016

(54) ELECTRIC CONNECTING MODULE FOR A MOTOR VEHICLE

(71) Applicant: Dr. Ing. h.c. F. Porsche Aktiengesellschaft, Stuttgart (DE)

(72) Inventors: Naser Abu Daqqa, Vaihingen an der Enz (DE); Thomas Schmid, Oberriexingen (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/844,115

(22) Filed: Sep. 3, 2015

(65) Prior Publication Data

US 2016/0072234 A1    Mar. 10, 2016

(30) Foreign Application Priority Data

Sep. 10, 2014    (DE) .......... 10 2014 113 024

(51) Int. Cl.
| | |
|---|---|
| *H01R 29/00* | (2006.01) |
| *H01R 13/73* | (2006.01) |
| *H01R 13/52* | (2006.01) |
| *B60K 6/00* | (2006.01) |
| *B60L 11/18* | (2006.01) |
| *B60L 15/00* | (2006.01) |

(52) U.S. Cl.
CPC .......... *H01R 13/73* (2013.01); *B60K 6/00* (2013.01); *B60L 11/1803* (2013.01); *B60L 15/007* (2013.01); *H01R 13/5202* (2013.01); *B60L 2210/30* (2013.01); *B60L 2210/40* (2013.01)

(58) Field of Classification Search
CPC ....... H01R 27/00; H01R 14/66; H01R 31/06
USPC .................................. 439/218, 171
See application file for complete search history.

(56) References Cited

U.S. PATENT DOCUMENTS

| | | | | |
|---|---|---|---|---|
| 2,610,996 A | * | 9/1952 | Rickabaugh ........... | H01R 4/363 361/823 |
| 4,487,467 A | * | 12/1984 | Guerrero .......... | H01R 13/62933 439/271 |
| 5,074,796 A | * | 12/1991 | Carter .................. | H01R 13/642 439/21 |
| 5,195,900 A | * | 3/1993 | Kumagai ............... | H01R 13/73 248/185.1 |

(Continued)

FOREIGN PATENT DOCUMENTS

| | | |
|---|---|---|
| DE | 102008042425 | 4/2010 |
| DE | 102012011824 | 1/2013 |

(Continued)

*Primary Examiner* — Phuong Dinh
(74) *Attorney, Agent, or Firm* — Gerald E. Hespos; Michael J. Porco; Matthew T. Hespos

(57) ABSTRACT

An electric connecting module (12) for an electric component (10) of a motor vehicle (40) has a connecting section (22) with at least two electrical contacts (36). A connecting housing (24) has a connecting opening that can be connected to the connecting section (22). The connecting housing (24) has at least one cable opening (18) that opens laterally on the connecting housing (24) in relation to the connecting opening for routing electric connecting lines (14) through the connecting opening (18) and to connect them to the contacts (36). The connecting housing (24) can be connected to the connecting section (22) in different rotational positions to route the connecting lines (14) in different directions in relation to the electric component (10).

10 Claims, 2 Drawing Sheets

(56) References Cited

U.S. PATENT DOCUMENTS

| | | | |
|---|---|---|---|
| 6,030,119 A | 2/2000 | Tachibana et al. | |
| 6,196,851 B1 * | 3/2001 | Gerard | H01R 35/04 439/20 |
| 6,717,051 B2 | 4/2004 | Kobayashi et al. | |
| 7,095,628 B2 | 8/2006 | Friedrich et al. | |
| 7,207,844 B2 * | 4/2007 | Peng | H01R 13/64 439/173 |
| 7,597,591 B2 * | 10/2009 | Leubner | H01R 9/2475 439/218 |
| 8,596,881 B2 * | 12/2013 | Umeno | G02B 6/3817 385/53 |
| 8,741,466 B2 | 6/2014 | Youngs et al. | |
| 8,821,172 B1 * | 9/2014 | Wu | H01R 27/02 439/218 |
| 2015/0104971 A1 * | 4/2015 | Staeber | F21V 23/06 439/527 |

FOREIGN PATENT DOCUMENTS

| | | |
|---|---|---|
| JP | 00993012 | 4/1997 |
| JP | 1064649 | 3/1998 |
| JP | 10277028 | 10/1998 |
| JP | 2000299151 | 10/2000 |
| JP | 2010212960 | 9/2010 |

* cited by examiner

ELECTRIC CONNECTING MODULE FOR A MOTOR VEHICLE

CROSS REFERENCE TO RELATED APPLICATION

This application claims priority under 35 USC 119 to German Patent Appl. No. 10 2014 113 024.3 filed on Sep. 10, 2014, the entire disclosure of which is incorporated herein by reference.

BACKGROUND

1. Field of the Invention

The invention relates to an electric connecting module for an electric component of a motor vehicle. The electric connecting module has a connecting section on the electric component and at least two electrical contacts. The electric connecting module also has a housing with a connecting opening that can be connected to the connecting section. At least one cable opening is disposed laterally on the connecting housing in relation to the connecting opening to route electric connecting lines through the connecting opening and to connect them to the contacts.

The invention also relates to an electrical circuit arrangement for a motor vehicle having a housing in which power electronics components are accommodated, and having an electric connecting module for making electrical contact with the power electronics components.

2. Description of the Related Art

High-voltage components, power electronics, batteries or the like of a motor vehicle generally are connected electrically to high-voltage cables and cable lugs. These electric connections then are covered by separate high-voltage covers to minimize the risk of short-circuits. The high-voltage cables usually are led off laterally to reduce the required installation space in the surroundings of the high-voltage cover. Such a high-voltage contact-making arrangement is shown in U.S. Pat. No. 8,741,466 B2.

The known high-voltage contact-making arrangement disadvantageously requires individual connecting modules to be developed for each high-voltage component, and high-voltage cable routing is predefined in accordance with the installation location in the motor vehicle. The cable routing can be used only for a specific installation variant and as a result does not permit use for different applications and installation locations in the motor vehicle, or only permits this with increased development expenditure.

The object of the invention is to provide an electric connecting module for an electric component of a motor vehicle where the electric component can be used in a flexible way for different applications.

SUMMARY

The invention relates to an electric connecting module with a connecting housing that can be connected to the connecting section in different rotational positions for routing the connecting lines in different directions. The invention also relates to an electrical circuit arrangement with such an electric connecting module. More particularly, the electric connecting lines can be led away from the electric component or the connecting section in different directions. Thus, compact electric cabling is possible depending on the installation location and application, and no additional design expenditure is necessary to adapt the connecting housing to a modified installation location. As a result, additional testing such as vibration or tightness testing, can be dispensed with, thereby reducing development costs for the electric components. Thus, the electric connecting module can be used in a flexible way for different applications.

The connecting housing may have a square base so that the connecting housing can be connected to the connecting section in four different rotational positions. As a result, four rotational positions of the connecting housing can be implemented with low technical expenditure, and the connecting lines can be led away in four different directions in relation to the electric component.

The connecting housing may be a right parallelepiped. This permits a particularly simple compact design of the connecting housing that can lead the connecting lines away in different directions in relation to the electric component.

The connecting opening can be on a side surface of the connecting housing. As a result, the electric connecting lines can be led out laterally from the connecting housing to achieve a compact design with low technical expenditure. The connecting housing can also have plural connecting openings, and can lead some of the connecting lines separately into the connecting housing to make contact with the electrical contacts.

The connecting section may have a recess in accordance with the shape of the connecting housing. As a result, the connecting housing can be countersunk at least partially into the connecting section to provide a fixed connection to the connecting section and a compact design.

The connecting section may have different side edges, and the electrical contacts may be spaced apart differently in relation to two of the side edges. As a result, incorrect cabling or connection of the electric connecting lines to the contacts in the different rotational positions can be avoided, since the electrical contacts are each at different distances from the side edges and therefore from the connecting opening.

The electrical contacts may be offset with respect to one another and may be spaced apart differently with respect to two adjacent side edges. As a result, it is possible to avoid interchanging the electrical contacts in the different rotational positions, since the electric connections are at different distances from the side edges and therefore from the connecting opening.

A sealing element may be arranged between the connecting section and the connecting housing so that a fluid-tight electric connection can be implemented with low technical expenditure.

The connecting housing may be attached to the connecting section by screws and the sealing element may be secured between the connecting housing and the connecting section by a screw connection. As a result, it is possible to seal the electric component with low technical expenditure.

The electrical contacts may be contact pins that protrude with respect to the connecting section to achieve a particularly simple and cost-effective mounting. The mounting may be carried out by screw connections and cable lugs so that high currents can be routed through the contact-making arrangement with low technical expenditure.

Overall, the electric connecting module of the invention can implement different installation locations of the electric component in the motor vehicle and different routing arrangements of the electric connecting lines, since the connecting housing can be secured to the connecting section in the different rotational positions. As a result the connecting lines can be led away from the electric component in the corresponding rotational positions and it is not necessary to use any restructuring or replacement parts, but rather only the rotational position has to be changed. Therefore, additional testing and restructuring can be dispensed with so that flexible use of the electric component in the motor vehicle is possible, and the development expenditure and the costs can be correspondingly reduced.

Of course, the features mentioned above and those explained below can be used not only in the respective specified combination but also in other combinations or alone without departing from the scope of the present invention.

Exemplary embodiments of the invention are illustrated in the drawing and will be explained in more detail in the following description.

DETAILED DESCRIPTION

Figure 1:
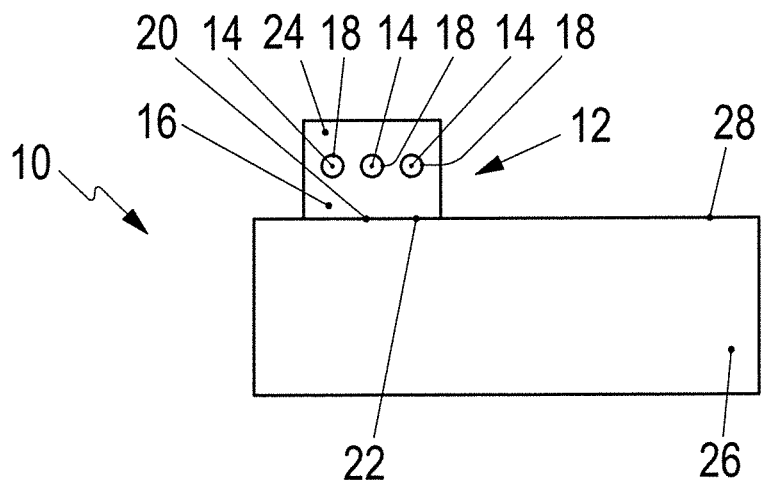
FIG. 1 is a schematic side view of an electric component for a motor vehicle having an electric connecting module.

An electric component of a motor vehicle is denoted generally by 10 in FIG. 1. The electric component 10 may be a high-voltage power electronics, a power inverter or the like, for actuating high-voltage components in the motor vehicle.

The electric component 10 has an electric connecting module 12 for making electrical contact between electric connecting lines 14 and the electrical contacts of the electric component 10. The electric connecting module 12 has a connecting housing 16 on which a multiplicity of cable openings 18 are formed, and the electric connecting lines 14 are routed through which cable openings 18. The connecting housing 16 is square and has a connecting opening 20 that is connected to a connecting section 22 of the electric component 10. The cable openings 18 are on a side surface 24 of the connecting housing 16 to route the electric connecting lines 14 laterally out of the connecting housing 16, thereby saving corresponding installation space above the electric component.

The electric component 10 has a housing 26 with a cover 28, and the connecting housing 16 is secured in a recess in the cover 28.

Electrical contacts in the form of pins are in the recess and can be connected electrically to the electric connecting lines 14 by cable lugs.

The connecting housing 16 can be secured to the connecting section 22 of the electric component 10 in different rotational positions so that the electric connecting lines 14 can be led away from the power electronics in different directions depending on the installation position of the connecting housing 16 for connection to a corresponding electric load in a space-saving manner depending on the particular installation space and installation location of the electric component 10.

The ability to secure the connecting housing 16 to the cover 28 or the connecting section 22 in different installation or rotational positions without additional components enables a flexible use of the electric connecting module 12 in the motor vehicle without additional tests or restructuring being necessary.

Figure 2:
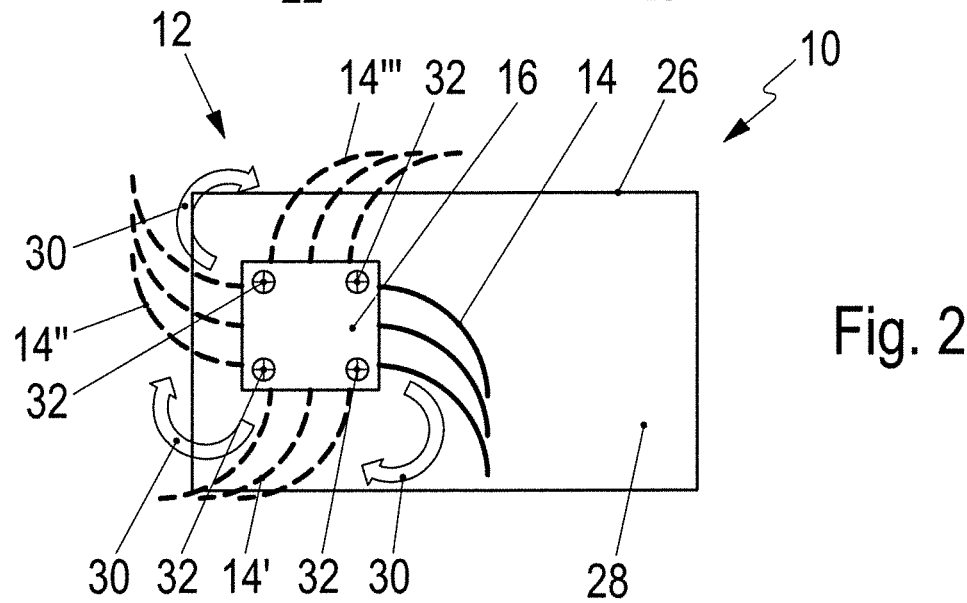
FIG. 2 is a schematic plan view of the electric component with the electric connecting module in different rotational positions.

FIG. 2 illustrates the electric component 10 with the electric connecting module 12 in a schematic plan view. Identical components are denoted by identical reference numbers, but only the particular features are explained here.

The connecting housing 16 is illustrated in four different rotational positions in FIG. 2, as indicated by arrows 30. The electric connecting lines 14 are routed in four different directions in accordance with the four different rotational positions, and are denoted by 14, 14', 14", 14''' in accordance with the rotational position. The connecting housing 16 can be attached in the four different rotational positions to the housing or the connecting section 22 of the electric component 10 by screws 32. Thus, different routing arrangements of the electric connecting lines 14 are possible by simply rotating the connecting housing 16.

Figure 3:
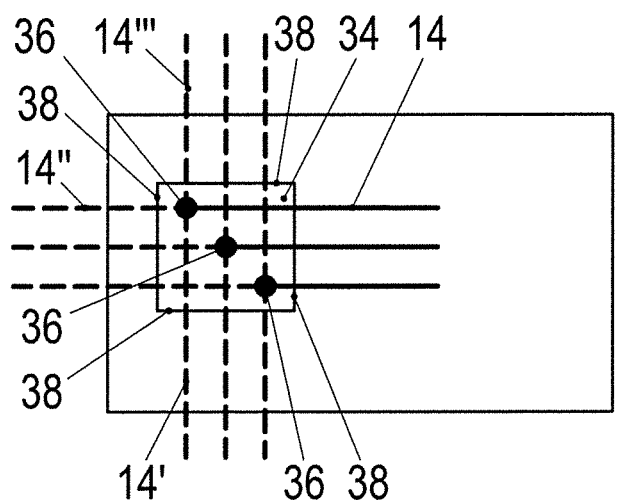
FIG. 3 is a schematic sectional view of the electric connecting module to explain the electric contact-making arrangement.

FIG. 3 is a schematic plan view of the electric connecting module 12 in a plan view. Identical elements are denoted by identical reference symbols, with only the particular features are explained here.

The electrical contacts 36 are arranged in a square recess 34 in the cover 28 of the housing 26 and are pins or bolts aligned perpendicular to a surface of the cover 28. The electrical contacts 36 are offset with respect to one another in the recess 34 and are at different distances from one of the outer edges 38 of the recess 34, and at a different distance from the adjacent outer edges 38. As a result, incorrect formation of contacts with the electric connecting lines 14 in the different rotational positions of the connecting housing 16 can be avoided, since the electric connecting lines are at correspondingly different distances from the electric connections in the respective rotational positions, starting from the cable openings 18. This permits secure electrical contacts to be made.

Overall, flexible and simple mounting or formation of electrical contacts of the electric component 10 can be ensured so that different installation locations of the electric component 10 are possible with different routing arrangements of the electric lines 14.

Figure 4:
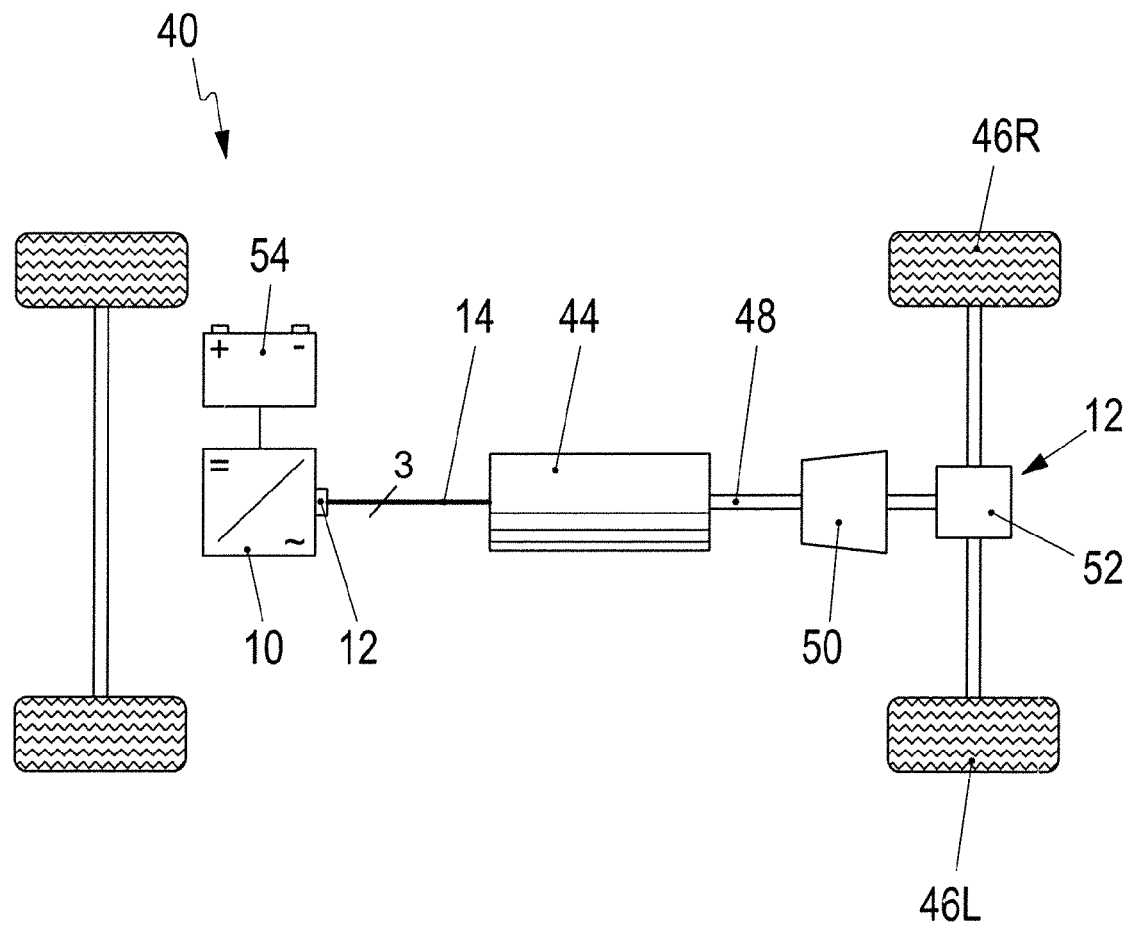
FIG. 4 is a schematic view of a motor vehicle with a drive train as an exemplary application for the electric component with the electric connecting module.

FIG. 4 illustrates an exemplary application of the electric component 10 in a motor vehicle 40. The motor vehicle 40 has a drive train 42 with an electric machine 44 that provides driving power for driving driven wheels 46R, 46L. The electric machine 44 is connected via a drive shaft 48 to a transmission 50 that transmits a driving torque via a differential 52 to the driven wheels 46R, 46L.

The electric machine 44 is connected via the electric connecting lines 14 to the electric component 10, which is a power inverter 10 in this embodiment, and converts the direct voltage, made available by a direct voltage source 54 or a battery 54, in order to actuate or drive the electric machine 44 correspondingly with alternating voltage and alternating current. The electric component 10 is connected to the electric machine 44 via the electric connecting module 12 and the electric connecting lines 14, with the result that the power inverter 10 can supply the electric machine 44 with electrical energy.

Depending on the embodiment of the motor vehicle 40 and of the electric machine 44 and the installation location of the electric component 10, the connecting lines 14 can be led out in a space-saving and optimum fashion from the electric component 14 and connected directly to the electric machine 44 by virtue of the different possible installation position or attachment position of the connecting housing 16.

Of course, the electric connecting module 12 is not restricted merely to the application for connecting a power inverter to the electric machine 44 and can be used for any high-voltage electric components in the motor vehicle 40.

What is claimed is:

1. An electric connecting module for an electric component of a motor vehicle, comprising:
    a connecting section on the electric component and having at least first and second electrical contacts;
    a right parallelpiped connecting housing mounted to the connecting section, the connecting housing having four side surfaces;
    at least one cable opening formed in one of the four side surfaces of the connecting housing;
    at least first and second connecting lines connected respectively to the first and second electrical contacts and routed through the at least one cable opening, wherein
    the connecting housing is configured to be connected to the connecting section in a plurality of orientations, so that the first and second connecting lines can be led out from the connecting housing in four directions in relation to the electric component.

2. The electric connecting module of claim 1, wherein the connecting housing has a square base surface so that the connecting housing can be connected to the connecting section in four different rotational positions.

3. The electric connecting module of claim 1, wherein the connecting section is a recess with a shape conforming to the shape of the connecting housing.

4. The electric connecting module of claim 1, wherein the connecting section has plural side edges, and wherein the electrical contacts are spaced apart differently in relation to two of the side edges.

5. The electric connecting module of claim 1, wherein the electrical contacts are offset with respect to one another.

6. The electric connecting module of claim 1, further comprising a sealing element arranged between the connecting section and the connecting housing.

7. The electric connecting module of claim 1, wherein the electrical contacts are contact pins that protrude with respect to the connecting section.

8. An electrical circuit arrangement for a motor vehicle, having a housing in which electric power electronics components are accommodated, and having the electric connecting module of claim 1 for making electrical contact with the power electronics components.

9. The electric connecting module of claim 1, wherein the connecting housing is connected to the connecting section by a plurality of screws.

10. The electric connecting module of claim 9, wherein the plurality of screws are provided in positions so that the connecting housing can be connected to the connecting section in four rotational positions.

* * * * *